Dec. 19, 1961      E. NORMAN      3,013,516

SHIP'S BUMPER

Filed March 28, 1960

INVENTOR
EINAR NORMAN
Carver and Company
BY Hugo Ray
Agent

United States Patent Office 3,013,516
Patented Dec. 19, 1961

3,013,516
SHIP'S BUMPER
Einar Norman, 261 7th Road, R.R. 2, Vancouver,
British Columbia, Canada
Filed Mar. 28, 1960, Ser. No. 18,002
2 Claims. (Cl. 114—219)

My invention relates to improvements in ship's bumpers.

The objects of the present invention are to provide a device which may be readily attached to the stem post or the guard strake of a tug or the like and which will protect the vessel's hull from damage by contact with a dock or with other craft.

Further objects are to provide a bumper which is economical to manufacture and of rugged construction capable of withstanding hard usage and exposure to the corrosive effects of salt water.

Figure 1:
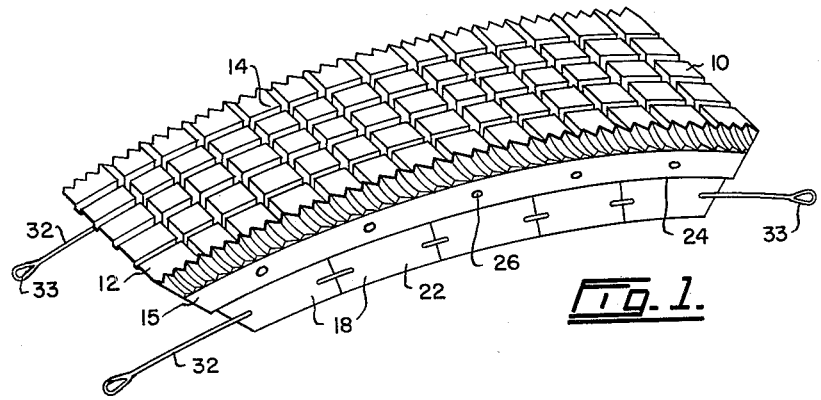
Figure 2:
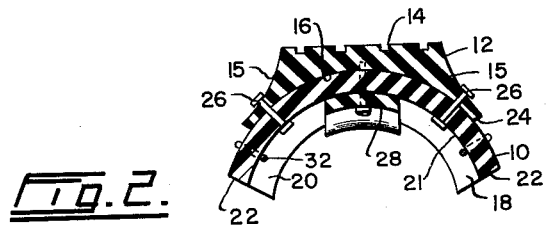
Figure 3:
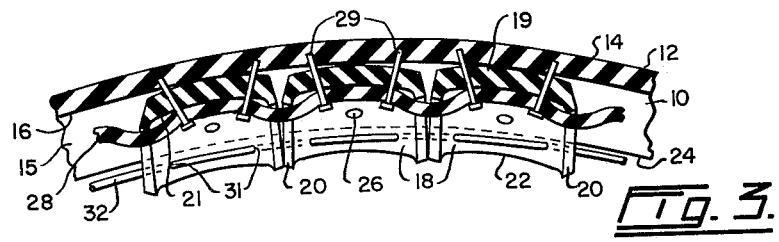
Figure 4:
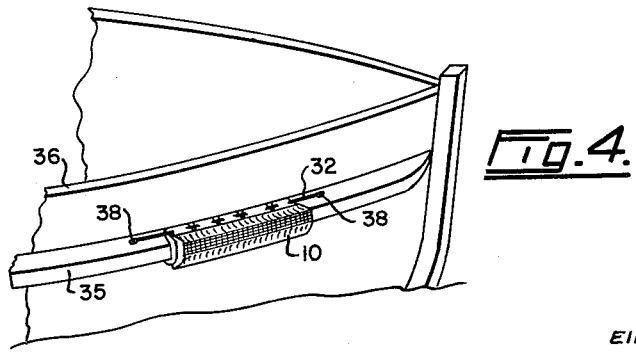

Referring to the accompanying drawing:

FIGURE 1 is a perspective view of the invention.
FIGURE 2 is a transverse section.
FIGURE 3 is a longitudinal section, part broken away.
FIGURE 4 is a reduced scale perspective view of the bumper secured to the hull of a vessel.

In the drawings like characters of reference indicate corresponding parts in each figure.

The bumper, indicated generally by the numeral 10, is preferably made up of a number of components which are cut from used automobile or truck tires.

A section is removed from a tire and the bead portion is severed therefrom to provide a slightly arcuate length of tire which serves as an outer cover 12 for the bumper. The cover 12 has a tread portion 14, side walls 15 and an inner face 16.

A number of short lengths are cut from a tire and the lengths are trimmed to provide transverse sections 18. Each section 18 has a tread portion 19, very narrow side walls 20 and an inner face 21. The sections 18 extend across the inner face 16 to the cover 12 in side by side relation as shown best in FIGURE 3. In this position the ends 22 of each section project a short distance beyond the marginal edges 24 of the outer cover, see particularly FIGURE 2. Each section 18 is secured to the outer cover 12 by a pair of transversely spaced fasteners 26 which extend through the side walls 15 of said cover.

From the tread portion of a tire an elongated strip 28 is cut which strip has a length equal to that of the outer cover 12. The strip 28 is secured to the inner faces 21 of the sections 18 by suitably spaced fasteners 29 which may extend into the inner face 16 of the cover 12.

Each section 18 is provided adjacent each of its ends 22, with spaced apertures 31.

As best shown in FIGURE 1 a length of cable 32 is threaded through the apertures 31 on each side of the bumper 10 and said cable is provided with eyed ends 33.

A bumper of this nature may be secured to the bumper strake 35 usually provided on the hull 36 of tug boats and similar vessels. The strip 28 is placed in contact with the outer surface of the strake 35 so that the ends 22 of the transverse sections 18 overlap the upper and lower surfaces of said strake. The eyed ends 33 of the cables 32 are suitably anchored as at 38 to the strake 35 and immediately prior to securing the cables sufficient tension is applied thereto to flatten the bumper 10 into close fitting contact with the strake.

The bumper, assembled and secured in position in the above described manner will protect the hull of the tug from the type of damage usually incurred when the vessel contacts a barge or wharf. Obviously the device could also be secured to the stem post of the vessel or to the portion of the bumper strake which extends around the stern of the tug.

What I claim as my invention is:

1. A ship's bumper comprising an outer cover formed of a length of tire and having a tread portion, side walls and an inner face, a plurality of tire sections extending transversely of the outer cover each of the tire sections having a tread portion, an inner face and end portions, said transverse sections being disposed in side by side relation with their tread portions in contact with the inner face of the outer cover and with their end portions projecting beyond the side walls of the outer cover, a strip of resilient material extending longitudinally of the outer cover in contact with the inner faces of the transverse sections, said resilient strip having a length substantially equal to the length of the outer cover and means for securing the transverse sections to the resilient strip and the outer cover.

2. A ship's bumper comprising an outer cover formed of a length of tire and having a tread portion, side walls and an inner face, a plurality of transverse tire sections secured to the inner face of the outer cover each of the transverse sections having a tread portion, an inner face and end portions, said transverse sections being disposed in side by side relation with their tread portions in contact with the inner face of the outer cover and with their end portions projecting beyond the side walls of the outer cover and a cable threaded through the projecting end portions of the transverse sections on each side of the bumper for securing the bumper to the ship.

References Cited in the file of this patent
UNITED STATES PATENTS

| | | |
|---|---|---|
| 2,413,210 | Blackman | Dec. 24, 1946 |
| 2,562,957 | Sipkin | Aug. 7, 1951 |
| 2,843,074 | Norman | July 15, 1958 |
| 2,874,669 | Norman | Feb. 24, 1959 |